Jan. 3, 1928.  1,654,749
W. NOBLE
FLUID PRESSURE BRAKE SYSTEM FOR AUTOMOBILES
Filed Feb. 16, 1920   4 Sheets-Sheet 1

Inventor
Warren Noble
by Wright, Brown, Quinby & Hay
Attorneys

Patented Jan. 3, 1928.                                                   1,654,749

UNITED STATES PATENT OFFICE.

WARREN NOBLE, OF PROVIDENCE, RHODE ISLAND, ASSIGNOR TO WILLIAM H. THORNLEY AND WARREN NOBLE, TRUSTEES, OF PROVIDENCE, RHODE ISLAND.

FLUID-PRESSURE BRAKE SYSTEM FOR AUTOMOBILES.

Application filed February 16, 1920. Serial No. 358,822.

This invention is concerned with the brakes of motor cars and has for its main object to enable the brakes of such vehicles to be applied effectively and with an intensity which is independent of the physical effort of the operator, but may be varied and made more or less intense under the operator's direct control. A further object is to enable the brakes of two or more wheels (including, if desired, the steering wheels of the car) to be applied with equal intensity, doing all this without complicated equalizing mechanism, and by means which is equally effective to achieve this result when the steering wheels are turned to any angle. Another object is to make possible easy disconnection from the system of any one or more of the brakes when unusual conditions occur, such as the deflation of the tire on one of the wheels. Still another object is to furnish a braking system applicable to a trailer and controllable by the driver of the motor car to which the trailer is attached. In this description the term "steering wheels" means and includes those road wheels of the car which are swivelled to permit of their being turned from side to side for steering.

This system makes use of fluid pressure, either hydraulic or pneumatic, for its operation, and in connection therewith it is a part of my object to provide means by which the necessary fluid pressure is developed by the motor of the car, or by the movement of the car, under control of the driver; to insure against external loss of the impelling fluid with attendant liability to derangement and dirtiness; and still further to make use, for the purpose of generating the brake applying pressure, of apparatus with which practically all of the high grade motor cars are equipped at the present day and consequently to utilize potential energy now wasted by such motors at all times during their self-actuating periods.

Stating the essential nature and character of the invention in a few words, it consists substantially in the provision of a system of piping with which are connected extenders applied severally to each of the brakes of the car, or some of them and likewise extenders for the brakes of the trailer when a trailer is coupled to the car, in imposing pressure upon fluid occupying such piping by means of a pump driven by the motor, or by a pump driven by the wheels of a trailer, in applying the pressure of the fluid to the brakes by extenders which are hydraulic motors, preferably of the seamless metallic bellows type; and in preferably using as the pressure fluid and the pump, the equipment generally provided at the present time with high grade automobiles for the forcible lubrication of the motor.

In order to explain fully the characteristics of the invention in such manner that those skilled in the art may make and use the same I have furnished drawings which show in a somewhat diagrammatic manner, but at the same time fully and completely, all the essentials of the invention and the manner in which the same may be operatively applied. In these drawings.

Figure 5ª is a fragmentary plan view similar to Figure 5 illustrating a modification in arrangement of one of the distributing pipes.

Like reference characters designate the same parts wherever they occur in all the figures.

In the particular system here illustrated the source of pressure, and the transmitting fluid by which pressure is applied to the individual brakes are, respectively, the lubricating system of the motor, and the oil provided for lubrication. All of such systems deliver oil in excess of the amount needed for lubrication to a pipe system communicating with the various bearings of the engine, and the surplus oil is returned through a by-pass to the oil-reservoir, which is commonly a pocket or sump in the bottom of the crank case. Likewise the pump is adapted to exert pressure upon the oil in excess of that needed to convey oil to the bearings, and the pressure actually used is maintained at the needed constant value by a spring loaded relief valve in the return by-pass. The fluid and source of pressure being thus provided ready to hand I find it convenient to make use of the excess volume of oil and the excess pressure developed by the pump for applying the brakes. For this purpose I provide a piping system conducting oil from the pump to those wheels which are equipped with brakes, and adjacent to each brake I provide an extender having a wall or head, which is capable of being moved under fluid pressure, and preferably having extensible walls of the bellows type which are connected with such movable head and with a fixed abutment by fluid tight joints. In brief I prefer to use as such extender the type of device known commercially as the sylphon bellows, or a device of similar nature. While other types of extender, such for example as a piston or plunger working in a chamber, are equivalent to the sylphon bellows so far as the main object of the invention is concerned, nevertheless the latter is superior on account of its freedom from the liability to leak and from frictional resistance. For convenience and brevity of description, but without intent to indicate any limitation in the scope of my claims, I will hereafter in this specification generally refer to the extender as a sylphon.

Figure 1:
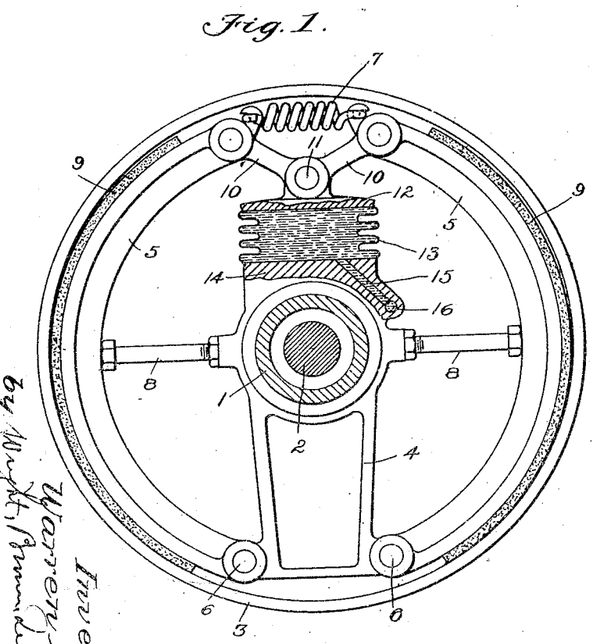
Figure 1 is an elevation of the type of brake used with the driving wheels of a motor car, said figure showing in cross section the rear axle upon which the wheel equipped with the brake is provided and the extender or hydraulic motor through which the actuating pressure is delivered to the brake.

Figure 1 shows a suitable mode of connecting a sylphon to apply the brake to a driving wheel, or in other words a wheel which is not swiveled to turn about a pivot other than its own axis with respect to the supporting structure. Here 1 represents in section the axle housing which supports the driving wheel, 2 represents the driving axle within the housing to which the driving wheel is secured, 3 represents the brake drum, which is to be understood as being secured to the driving wheel, 4 represents a bracket secured to the housing, and 5—5 represent brake shoes pivoted by pins 6—6 to the bracket 4 and arranged within the brake drum. The movable ends of said brake shoes are provided with hooks to which are connected the ends of a helical take off spring which normally withdraws them from the brake drum to the limit permitted by stop rods 8—8 mounted on and projecting from the sides of the bracket. The brake shoes may be of any common or other suitable design, and as here shown they are of a standard form, each consisting of a sector of cast metal, as cast iron or aluminum, having substantial rigidity, and provided with a facing 9, which may be any of the asbestos or composite fabrics, or other materials adapted to be used as brake shoe and brake band facings and linings. The free ends of the brake shoes are likewise connected to the links 10—10 of a toggle movement, the knuckle of which is the pin 11 supported by the movable head 12 of a sylphon, the bellows part of which is indicated at 13. This bellows wall is secured by fluid-tight joints to the head 12, on the one hand, and to an abutment 14, on the other hand, said abutment being rigidly supported on the housing 1, and being conveniently part of the same structure with the bracket 4. This structure is conveniently made with a hole adapted to receive the housing and to fit thereon, and it may be secured by any suitable means, as by set screws, welding, brazing, or otherwise. In the abutment there is a passage 15 running from the space within the sylphon to a passage 16 so arranged that it may be connected with a connecting pipe.

It will be apparent that flow of oil under pressure into the sylphon causes the movable head to be extended and the toggle linkage to be more or less flattened or straightened, whereby the brake shoes are first moved into contact with the brake drum and then pressed against the latter. This action takes place against the resistance of the take off spring 7, which spring is effective to retract the brake shoes when provision is made for efflux of liquid from the sylphon. It may be desirable in some cases to mount the sylphon and its abutment head 14 in a manner permitting pivotal or angular movement about the axle, or about another axis parallel thereto, in order to insure equal intensity of pressure by both brake shoes, but ordinarily sufficient flexibility is present in the sylphon itself for this purpose.

Figure 2:
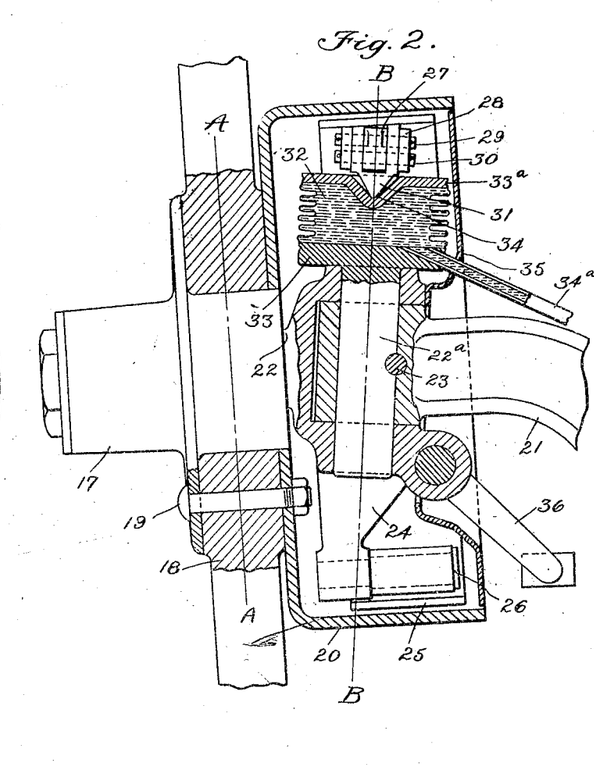
Figure 2 is a vertical axial section of a brake and its extender applied in accordance with this invention to one of the steering road wheels of a motor car.

Figure 2 shows the principles of the means by which I prefer to apply the sylphon extended principle to brakes upon any wheel which is swiveled to permit of its being turned in steering the vehicle. With the ordinary makes of motor cars these are the front wheels, while in the case of trailers usually both front and rear wheels are so swiveled. The arrangement now being described is part of the combination embodying my invention consisting of a complete braking system including brakes on all four wheels of the vehicle.

Here 17 represents the hub of the wheel, 18 a part of the wheel in section, 19 the bolts connecting the hub to the wheel section, 20 the brake drum secured to the wheel, 21 the main axle, 22 the stub axle or knuckle on which the wheel has its bearing and 22ª the pin by which said stub axle is pivoted to the main axle, said pin being itself secured against rotation by a cotter pin or key 23. 24 is a bracket or arm projecting from the stub axle knuckle and carrying pins on which the brake shoes are pivoted. One of the brake shoes is indicated at 25 and the pivot pin therefor at 26. The brake shoes here provided and their arrangement and mode of mounting may be the same as those shown in Figure 1, wherefore it is deemed unnecessary to show them in further detail. 27 and 28 represent the links of a toggle mechanism which are respectively connected to the two brake shoes by pins 29, and are joined by a knuckle pin 30 with a toggle center 31 which has a conical point. The sylphon is shown at 32 and comprises a flexible bellows or corrugated form of tube secured at one end to a fixed head 33, which is a part of or securely attached to the pin 22ª, and secured at its opposite end to a movable head 33 which has a depression 34 in its exact center which is entered by the conical point of the toggle center. It will be noted that the median plane of the toggle linkage is in the axial line of the swivel stud 22ª, and that the included angle of the point 31 is less than that of the depression 34, while said point and depression are symmetrically arranged. Thereby expansion of the sylphon applies pressure in a direct line to the toggle through a frictionless point contact, wherein enough freedom of play is allowed to secure equal intensity of pressure by both brake shoes. 34ª is the tube conducting oil to and from the sylphon; and 35 is a dust guard or cover secured to the stub axle forging and protecting the entire mechanism. 36 is the steering arm rigidly connected to the stub axle knuckle and adapted to be connected by suitable linkage with the steering post or rod of the automobile. In this figure A, A and B, B represent respectively the median plane of the wheel and the axis of the swivel pin 22, which are inclined one to the other to intersect at the center of contact of the wheel tire with the ground, according to common practice. As the pressure contact between the sylphon and the brake toggle is in the center line B, B the entire mechanism supported from the stub axle may be swiveled around this line without disturbance, and thus it is made possible to mount the sylphon non-rotatably and at the same time permit the front wheel to be turned in any degree necessary for steering the automobile. The immovability of the sylphon with respect to the main axle 21 allows the pipe system to be rigidly connected to the front axle and avoids the need of movable joints in the system or a flexible section at this point.

Figures 5, 5A:
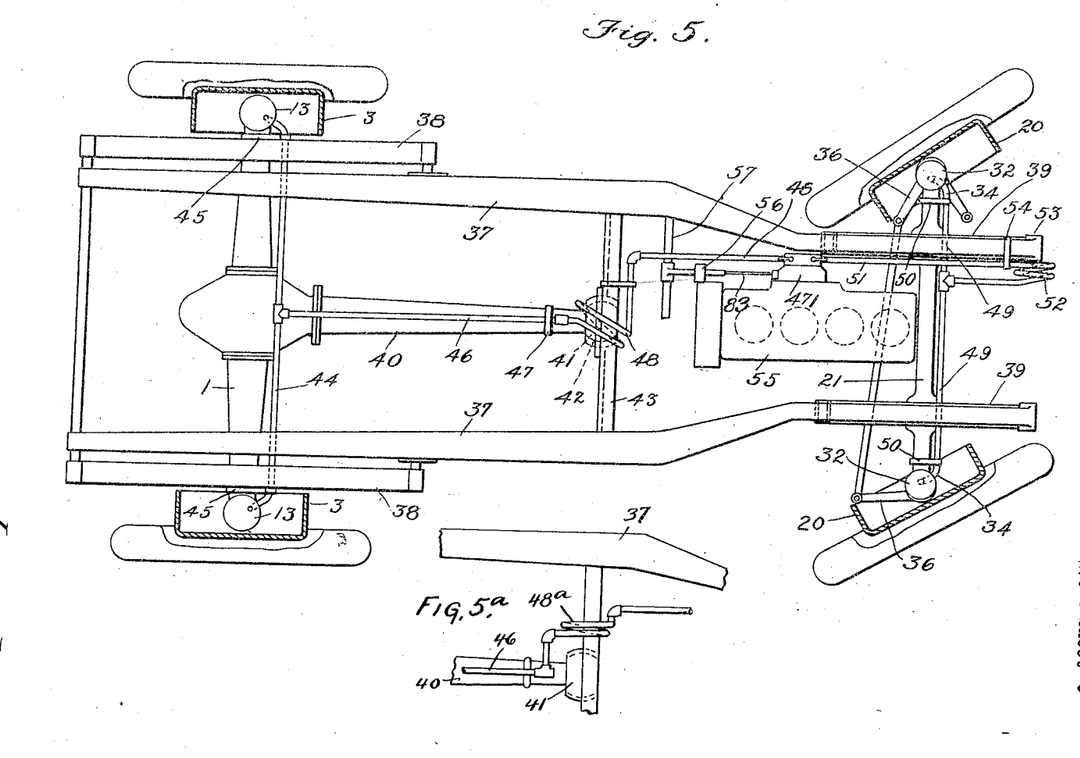
Figure 5 is a plan view of the frame and wheels of the motor car illustrating diagrammatically an operative mode of applying the braking system to the car.

Reference is now directed to Figure 5 to show the arrangement of the entire system in an automobile of common type having rear driving wheels and swiveled front wheels, with brakes on all four wheels. Here also the rear and front brake drums are designated 3 and 20, respectively, and the corresponding sylphons 13 and 32. I have not attempted to show in this figure the details of the brake shoes and the mechanisms through which the sylphons operate them, as my purpose has been to show here with the least possible complication the general arrangement of the system. The side bars of the chassis are shown conventionally at 37, 37, the rear springs at 38, 38, the front springs at 39, 39 and the rear axle housing and front axle by the numerals already used. The type or form of automobile represented is a common form in which the torque and thrust of the rear axle are absorbed by a central tube 40 having a spherical head 41 held in a socket 42 formed by brackets suitably secured to a cross member 43 of the chassis. The pipe system consists of the tube 44 leading to the connections 16 (Figure 1) of both rear sylphons, and preferably connected rigidly to the rear axial housing by suitable means, here indicated as clips 45. The system further includes a distributing pipe 46 rigidly secured to the torque tube 40 by suitable means, designated conventionally herein as a clip 47 and joined to the pipe 44. The purpose of the pipe 46 is to distribute oil delivered from a control valve 471, which is preferably secured to a part of the engine, to the sylphons controlling the rear brakes, and in order to reduce to the minimum the distortions in this pipe due to relative movement between the chassis and the rear axle, there is interposed in the line of the pipe 46 a coil 48 located as near as is conveniently possible to the center of this relative motion. Such center is in the ball and socket joint comprised by the spherical head 41 and the socket 42, wherefore the coil is preferably disposed so as to surround this coupling with its center coincident with the center of the coupling. The coil may, however, be otherwise located if required, and one other possible location is indicated by the modification shown in Figure 5ª, where an equivalent coil 48ª is located at one side of the coupling but with its axis in line with the center thereof. The coil permits movements to take place between the parts of the pipe 46 resulting from movement of the car body relatively to the wheels, without harmful distortion of the pipe or harmful stresses upon the joints in the pipe line. By securing the pipe at one side of the coil to the tube 40, and that at the other side to the cross beam 43, all distortions of the pipe are localized in the coil, and the latter has such length and flexibility as to avoid being harmfully strained by the movements which there take place. Drawn metal tubing is suitable for the pipe line, including the coil, just described and another coil presently to be described, and steel is one of the materials suitable for such tubing.

For the front wheel brake sylphons there are provided supply pipes 49 of which it may be considered that the tube 34 previously described is an end. Said pipes are rigidly secured to the front axle, as by clips indicated at 50, and are connected to a common distributing pipe 51, which leads from the control valve 47. In order to localize and diminish the distortions due to movements of the vehicle body relatively to the front axle, this pipe is carried forward and provided with a coil 52 coaxial with the front spring eye 53 by which the front spring is pivoted to the side bar. That part of the pipe near the front end of the bar may be secured thereto by a clip 54 or otherwise. The purpose, function, and effect of the coil 52 are essentially the same as of the coil 48 already described.

Figure 5 further indicates at 55 the position of the motor in order to show that the control valve 471 is preferably secured thereto. It also indicates a brake pedal 56 on a supporting shaft 57, and shows a connection between such brake pedal and the control valve. I will now describe the valve and its operating means, in detail, turning for that purpose to Figure 3. The valve body or casing as a whole is designated 471. It has a passage 58, in the opposite ends of which are joined the distributing pipes 46 and 51, and in which are interposed stop cocks 59 and 60. This passage is connected at a point between the stop cocks with a duct or port 61, which leads into the chamber occupied by a piston valve 62. Said piston valve is movable endwise in said chamber and passes to the exterior thereof through a stuffing box 63. It is drilled, or may be otherwise constructed, to furnish a pressure passage 64 and an exhaust or relief passage 65, so arranged that when the pressure passage is brought into register with the port 61 it also registers with a supply passage 66, and when the passage 65 is brought into register with the port 61 it also registers with a passage 67 for exhaust or discharge of the oil. The passage 66 is connected at 68 with a pipe 69 branching from the distributing system which supplies oil for lubricating the engine and is diagrammatically represented at 70, 71 and 72. 73 represents diagrammatically the pump, which is commonly a gear pump, provided to create pressure in the oil supply, and having its suction intake 73ª in the oil well or sump 74 of the engine crank case. From the passage 66 is a branch 74ª opening into the relief valve chamber 75, in which is a relief valve 76, shown as of a common ball form and as being pressed against its seat by a spring 77. An outlet 78 leading from the relief chamber discharges the excess of oil furnished by the pump into the sump. The pressure of the relief spring resisting such discharge determines the pressure which is imposed upon the oil by the pump.

Figures 3, 4:
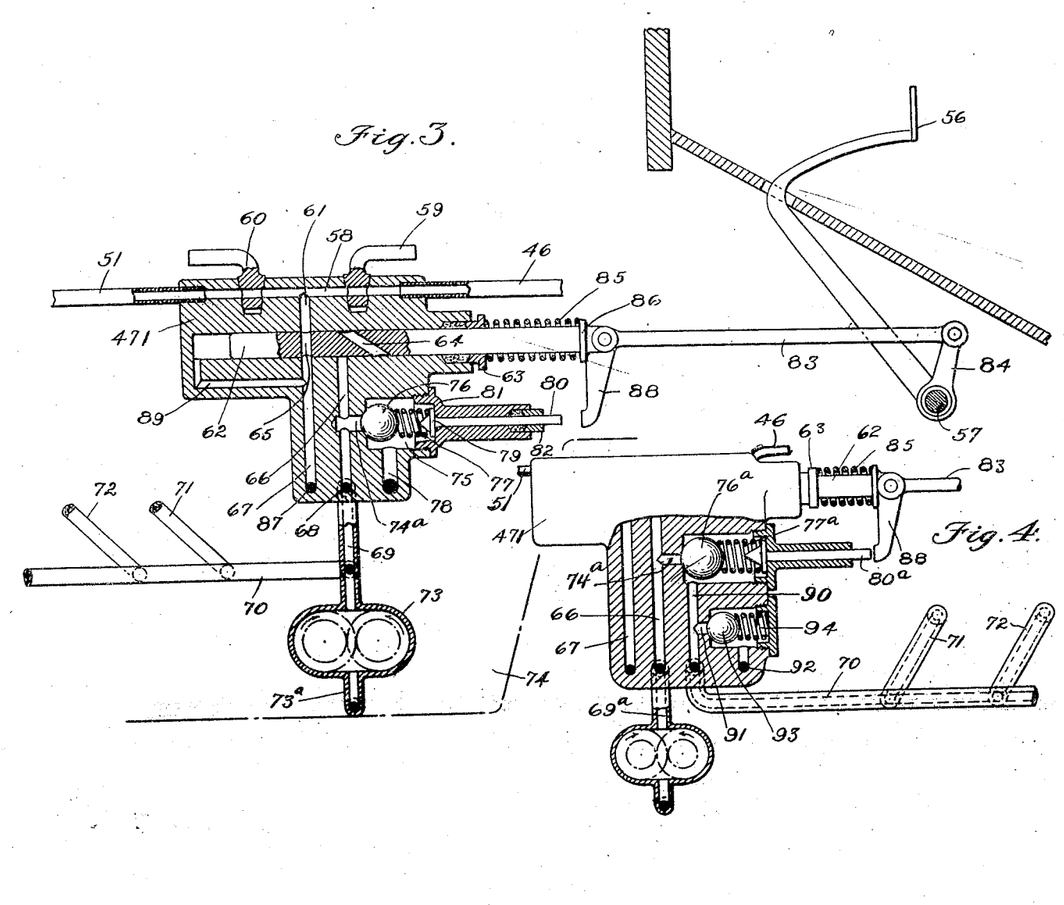
Figure 3 is a longitudinal central section of the controller valve for the hydraulic system, showing also diagrammatically the manner in which said valve may be coupled to a pedal or equivalent actuator under control of the operator, and the relation to said control valve of the pressure lubricating system of the car, or other means for developing fluid pressure.
Figure 4 is a sectional view of a modified form of control valve, with which is associated a diagrammatic representation of its relation to the lubricating system of the car and the pressure pump thereof.

This spring is backed up by a head 79 on a plunger 80 which has sliding movement in a guide formed as part of the relief valve chamber cover 81, and passes through a stuffing box 82 at the end of such guide. The projecting end of the plunger furnishes a means by which additional pressure may be imposed upon the relief valve.

The piston valve 62 is connected by a link 83 with an arm 84 on the shaft 57 previously mentioned as supporting the brake pedal 56. A spring 85 surrounding the external part of the valve and confined between the stuffing box 63 and an abutment 86 on the valve normally tends to move the valve outward and put its passage 65 in connection with the port 61 and the exhaust passage 67, which discharges through an outlet 87 into the oil sump. Depression of the brake pedal moves the valve against the resistance of the spring into the position wherein passage 64 connects the supply passage 66 with the port 61. There is rigidly secured to the valve an arm 88 arranged in line with the plunger 80 and spaced at such a distance from the end of the latter that it bears against said plunger shortly after the passage 64 begins to make communication between the passages 66 and 61. From the inner end of the valve chamber there is a duct 89 leading into the exhaust passage 67 and provided to avoid trapping of oil back of the valve.

It will now be understood that while the motor is running, oil is being continuously supplied to the lubricating system by the pump in excess of the needs of lubrication, and that the excess is being constantly returned to the oil sump past the relief valve, the loading of said relief valve enabling the pump to impose on the oil the pressure necessary to force oil through the restrictions constituted by the bearings, etc. to which oil is supplied. Normally the exhaust passage through 61, 65, 67 and 87 is open, whereby the brakes are allowed to be relaxed and the sylphons correspondingly collapsed. Now if the driver wishes to set the brakes, he depresses the brake pedal in the usual manner, with the consequent effect that said exhaust passage is stopped, and the supply passage is opened from the pump through the channel 64 in the valve and the duct 61 to the distributing pipes. Then part of the oil delivered by the pump is admitted to the pipe lines, exerting a pressure which is transmitted to the sylphons, whereby the sylphons are expanded and caused to move the brake shoes into contact with their respective drums. The first result, which occurs preferably before the plunger 80 is moved at all, is to build up such pressure in the sylphons as is afforded by the relief valve loading, which may or may not be enough to have any appreciable braking effect. Additional pressure is applied by further movement of the pedal, which then displaces the plunger 80 and so increases the loading upon the relief valve, with corresponding increase in the pressure developed in the oil; for the registering mouths of the passages 61 and 64 are made wide enough to permit, without closing the supply passage, the full movement of the pedal needed to apply the maximum loading. The intensity of this pressure is generally proportional to the extent of the movement of the brake pedal, that is, it can be continually increased while the pedal is being further depressed. Inasmuch as the movement of the brake shoes is very small from their position of first contact with the drum to the position of tightly seizing it, the full pressure available is accumulated very rapidly and in approximate proportion to the rate of movement of the brake pedal. In other words the braking effect is substantially coincident with the action of the pedal, which satisfies the essential condition of ease and safety in driving, which is that the intensity of braking must be capable of government by the operator to the utmost nicety. Consequently the relation of the brake take off springs to the relief valve spring is made such that the pressure controlled by the normal relief valve loading is only sufficient to bring the brake shoes into contact with their drums, and to provide a relatively easy braking effect. Thereafter the intensity of braking effect is substantially exactly proportional to the movement of the pedal in either direction, and is without appreciable lag, whereby the control by the driver is as sensitive as with the wholly mechanical brake systems. In other respects this fluid system has numerous advantages over the mechanical system, some of which will be later mentioned.

I will now, and generally hereinafter, distinguish by the term "grading valve" the combination of relief valve and variable spring mechanism which I have just described. Such grading valve may, of course, be connected to any movable part controllable by the driver, but I have preferred to connect it to the brake pedal in order to permit its operation by the same sort of means as are already familiar to all drivers.

Certain engines are particularly sensitive under low load conditions to changes in the flood of lubricating oil expelled from the bearings by the pump pressure, any excess beyond the normal being made evident by smoking at the exhaust and spark plug trouble. Moreover, with a badly worn engine, it might be difficult to build up enough pressure to operate the brakes with enough intensity in an emergency, for it is the closeness of the fit of the engine bearings which ultimately limits the hydraulic pressure which can be applied to the brakes and maintained. In order to compensate for such conditions and make the braking pressure independent of any characteristics of the engine, I have devised an alternative form of grading valve which I have shown in Figure 4. Here the main features of the valve and its connections with the lubricating pump, with the distributing pipe system to the several brake extenders, and with the brake pedal or other operating control, may be considered to be the same as those previously described; wherefore corresponding parts are designated by the same reference numerals as are used in Figure 3. The difference consists principally in this, that instead of the oil furnished to the grading valve from the pump being brought thereto by a branch in parallel with the lubricating system, all of the oil passes through the grading valve before passing to the lubricating system. That is, the entire discharge from the pump passes through pipe 69ª into the passage 66 and thence must flow past the relief valve 76ª and through passage 90 before it enters the main pipe 70 of the lubricating system. From the passage 90 there is a branch 91 which opens into a secondary relief chamber from which there is a return outlet 92. A secondary relief valve 93 loaded by a spring 94 governs the pressure in the lubricating system. With the engine running normally and the brakes not in operation, all the oil passes the grading valve 76ª and so much of it as is needed for lubrication passes to the pipe 70. Whatever pressure is imposed on the oil in the brake system due to increased loading on the valve 76ª has no effect upon the pressure of that delivered to the lubricating system because the lubricating system is altogether beyond the grading valve and controlled entirely by its own relief valve. No diminution of flow in the lubricating system will be caused by the increased grading valve pressure because, when the brake system has been filled to the point of extending the brake shoes into contact with their brake drums, no appreciable further quantity of oil is necessary to build up the braking pressure to the maximum; consequently all the oil flowing in the lubricating system is governed as to pressure by the relief valve 93 irrespective of the loading of the grading valve. It being assumed that the brake system of sylphons and distributing pipes is filled with oil, the amount of oil needed to be taken from the lubricating supply to set the brakes is only that needed to expand the sylphons in moving the brake shoes from the relaxed position into contact with the brake drums, and substantially all of that quantity is supplied before the grading valve loading is increased to intensify the braking action. This amount is readily supplied, since the pump is constantly delivering a greater volume than that needed for lubrication.

I have already intimated, and intend to make fully clear at this point, that it is not at all indispensible that the lubricating pump of the engine and the oil provided for lubrication be employed for the operation of the brake system, but merely that that means is logically and commercially the proper means to use. When occasion requires other fluids than oil may be provided as the pressure transmitting medium, and as such fluid I may use any gas or any liquid which is conveniently available and against which no fatal objection exists; and I may provide a special pump or compressor for developing pressure in such fluid, which pump may be driven by the motor; or, in the case where a trailer is coupled to an automobile, such trailer may be equipped with a pump of its own, driven by its road wheels.

It is to be understood that the representation of the sylphons in the drawings is to a certain extent diagrammatic, as no filling caps are indicated, and that the sylphons are completely filled with the pressure fluid. After once being filled the system will stay full by reason of atmospheric pressure and the fact that the construction of the sylphons prevents leakage and that the joints of the distributing pipe system may be made sufficiently tight by ordinary means. The only discharge takes place when the exhaust passage of the control valve is opened, and then the amount of discharge is limited by the distance to which the brake shoes are permitted to be retracted.

Figure 6:
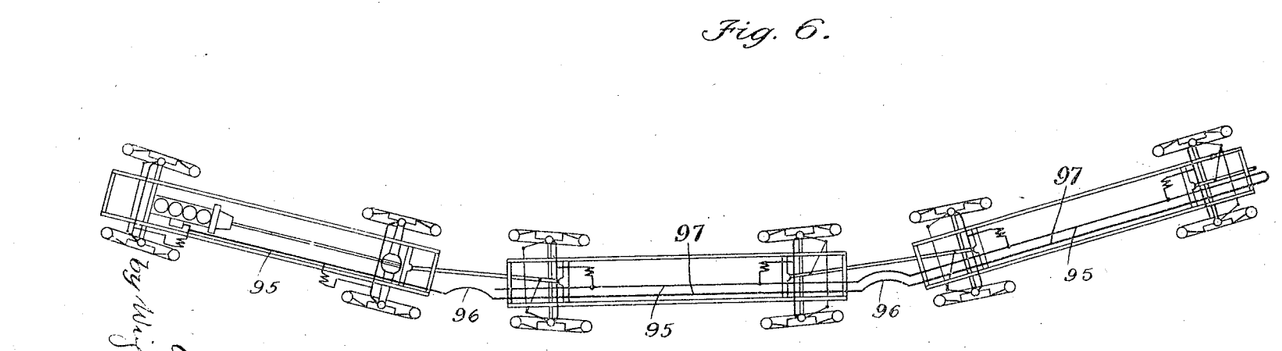
Figure 6 is a view similar in its nature to Figure 5 and showing the combination of a motor car and connected trailers with the braking system extended to the trailers.

The same essential principles may be extended to provide braking means for trailers, such as are commonly used with automobiles for commercial transportation, all under the control of the driver of the automobile. Figure 6 shows, likewise in a diagrammatic way the mode of such extension, and this also is a part of my invention. Most trailers are supplied with swiveling front and rear wheels to follow the path determined by the steering gear, and they are so shown in this diagram. That being the case, the type of extender shown in Figure 2, is used. Each trailer is preferably equipped with a central distributing pipe 95 which is connected with the corresponding pipes of other trailers, and with one of the distributing pipes of the automobile, either directly or ultimately, as later explained, by flexible connections 96, and from which branches lead to the individual extenders, substantially as already described in connection with Figure 5. In the pipe system of any trailer, coils analogous to the coils 48 and 52 may be provided at any point where their presence is made necessary by the conditions of relative movement between the parts of the trailer whereon different parts of the pipe system are mounted. Ordinarily, however, the pipe system may be supported wholly by the axles of the trailer and not in any part by the body or chassis, and in such case there is no need to provide for flexibility. With trailers thus connected, the brakes thereon may be set simultaneously with those of the towing automobile by manipulation of the one control valve. However, in the case where trailers are used it might be necessary either to provide the automobile with a pump of larger capacity than the ordinary engine lubricating pump, or with an additional pump, in order to supply the fluid to all the brake extenders as rapidly as might be needed in an emergency; and my invention includes such special or additional pump, which may be like the pump 73, wherefore it is not necessary to be shown in Figure 6. When two or more trailers are coupled in train and the brakes of all of them are applied by pressure generated by a pump on the towing car, there may be a certain time loss or lag in the setting of the brakes more remote from the pump; and in order to make beneficial use of such lagging to maintain tension in the draw bars, I prefer to provide in each trailer a second pipe, 97, connected in a through line with the pipe system of the automobile, and then connected with the distributing pipes of the rearmost trailer. Thereby the braking effect is applied first to the rear trailer, and subsequently to that, or those, ahead of it.

The brake system thus described, and any other specific system having equivalent elements and principles, offers many advantages over the brake systems heretofore used with automobiles. In the first place it enables the braking effort to be applied without sensible exertion on the part of the driver, while it is as fully sensitive as the mechanical and other systems in which the effort is applied wholly through the muscular exertion of the driver; and the braking effort may be applied in any intensity, increased, diminished or held, as readily as with mechanical systems. Brakes may be applied on all four wheels of the car and the braking effort distributed in absolute equality to all the brakes, whether the steering wheels are in the central position or are turned to either side. The system is perfectly self-compensating as to the distribution of the braking effect among the several wheels, and has no need for the elaborate compensations which have been found necessary in the attempt to apply mechanically actuated brakes to the swiveled front wheels of automobiles. As the brake extenders are fluid-tight expansible fluid containers, there is no possibility of leakage, and hence no opportunity for loss of pressure through leakage or for the accumulation of dirt due to leakage and adhesion of dust. For the same reason, and in the case where the brake system is coupled to the lubricating system of the engine, there is no expenditure of lubricating oil, while the volume of oil diverted in the course of applying the brakes is so small in proportion to the normal excess capacity of the usual engine lubricating pump that the diversion from the lubricating system is not noticeable. It should be noted also that even this small diverted flow of oil occurs under the most favorable circumstances, as the only pressure involved in bringing the brake shoes up to contact with the brake drums is that required to overcome the influence of the take off springs; while the full difference in pressure between the lubricating system and atmosphere is available to expedite flow of oil to the sylphons, and in consequence the action of the brakes may be almost instantaneous.

Where brakes are applied to the swiveled front wheels, flexibility is not required in the piping, owing to the fact that the sylphons there are immovably held, and the only flexibility required in the piping is that needed to take care of the ordinary spring action of the automobile body. Also by the provision of shut off cocks as already described, or cocks otherwise inserted at suitable points in the piping, any brake or combination of brakes may be put out of service with a minimum of trouble.

Having thus explained the principles of my invention and described a mode in which it may be usefully applied, although without having attempted to describe all the forms in which it may be embodied, or all the modes of its use, I declare that what I claim and desire to secure by Letters Patent is:

1. In an automobile a brake, a fluid actuated extender for applying said brake arranged to be actuated to that end by accession of fluid under pressure, a pump arranged to deliver fluid against a yielding resistance, operator-controlled means for increasing such resistance, a branch connection from the outlet of said pump to the extender, and a valve under control of the operator adapted to open and close said branch to flow of the fluid.

2. A brake system for automobiles comprising a pump, a brake, an extender operable by fluid pressure arranged to apply said brake under accession of a pressure-transmitting fluid, a connection leading between said pump and the extender adapted to transmit the actuating fluid, an operator-controlled valve in said connection, an outlet from the pump through which fluid operated on by the pump normally passes, and operator-controlled means for applying a variable yielding resistance to the flow of the fluid from said outlet.

3. A brake system for automobiles comprising a pump, a brake, an extender operable by fluid pressure arranged to apply said brake under accession of a pressure-transmitting fluid, a connection leading between said pump and the extender adapted to transmit the actuating fluid, an operator-controlled valve adapted to open and close said connection, an outlet from the pump through which fluid operated on by the pump normally passes, means for applying yielding resistance to the flow of the fluid from said outlet, and means controlled by the operator simultaneously with the opening of said valve for increasing the resistance so applied.

4. A brake system for automobiles comprising in combination a wheel, a brake cooperative with said wheel, a fluid-actuated extender engaged with said brake, a pump, a pipe line from said pump to said extender, there being a relief outlet from said pipe line, and a spring-loaded grading valve covering said outlet, controllable by the operator to oppose greater or less resistance to relief of fluid from the outlet, whereby the pressure delivered from said pump to said extender is governed and regulated.

5. A brake system for automobiles comprising in combination a wheel, a brake cooperative with said wheel, a fluid-actuated extender engaged with said brake, a pump, a pipe line from said pump to said extender, a control valve casing interposed in the pipe line and including a supply passage arranged to receive the fluid delivered from the pump, a relief outlet branch from such supply passage, an outlet to the pipe line, and an exhaust discharge passage, an operator-controlled valve having ports and being movable to connect with said supply passage or said exhaust passage exclusively with said outlet, a yieldingly loaded relief valve controlling said relief outlet branch, and operator-controlled means for varying the intensity of loading of said relief valve.

6. A fluid pressure brake system for automobiles comprising a wheel brake, a fluid-actuated extender for said brake, a pump, a valve casing having a supply passage connected to receive fluid delivered from said pump and having an outlet, a pipe line connected with said outlet and leading to said extender; said valve casing having also a relief branch from said supply passage, an exhaust passage, and a valve chamber into which said supply and exhaust passage and said outlet all open; a control valve in said chamber constructed and being movable to make connection exclusively between either the supply passage or the exhaust passage and the outlet, a spring-loaded grading valve controlling said relief branch, and means adapted to be operated by the driver of the automobile for shifting the control valve into the position for connecting said supply passage with said outlet and thereupon increasing the loading of said relief valve.

7. A braking system for an automobile and an attached trailer, comprising the combination with such automobile and trailer, of wheel brakes on the automobile and trailer, respectively, fluid-operated extenders for applying said brakes, a pump on the automobile driven by the motor of the automobile, coupled pipe lines carried by the automobile and trailer, with which their respective brake extenders and said pump are in connection, valve means operable by the driver of the automobile for diverting fluid under pressure acted on by said pump to said pipe lines, an outlet from the pump through which fluid discharged from the pump normally passes, and flow-resisting means in said outlet also controlled by the driver for regulating and altering the intensity of pressure applied by the pump on the fluid so diverted.

8. In a fluid pressure brake system for automobiles, the combination with the automobile, its road wheels, and its motor, of brakes associated with all of said wheels, fluid-pressure-operated extenders coupled individually to the brakes of the several wheels, a pump driven by said motor, conducting means for fluid between said pump and extenders having a relief outlet, a resiliently loaded valve obstructing said outlet, and operator-controlled means for varying the resilient loading of said valve.

In testimony whereof I have affixed my signature.

WARREN NOBLE.